May 13, 1952  G. L. BRIDWELL  2,596,524
PORTABLE POWER SAW GUIDE AND SUPPORTING MEANS
Filed Aug. 27, 1951  2 SHEETS—SHEET 1

INVENTOR
GAIL L. BRIDWELL,
BY Babcock & Babcock
ATTORNEYS

May 13, 1952     G. L. BRIDWELL     2,596,524
PORTABLE POWER SAW GUIDE AND SUPPORTING MEANS
Filed Aug. 27, 1951     2 SHEETS—SHEET 2

INVENTOR
GAIL L. BRIDWELL,
BY *Babcock & Babcock*
ATTORNEYS

Patented May 13, 1952

2,596,524

UNITED STATES PATENT OFFICE 2,596,524

PORTABLE POWER SAW GUIDE AND SUPPORTING MEANS

Gail L. Bridwell, Santa Ana, Calif.

Application August 27, 1951, Serial No. 243,879

5 Claims. (Cl. 143—6)

This invention relates to portable power saw guide and supporting means.

The primary objects of this invention are: to provide a very cheap, simple and sturdy portable power saw guiding and supporting means which will automatically swing the power saw up out of the way when not in use and which may be partially rotated about a fixed pivotal point and locked in any one of several points in a given, preferably horizontal, plane for making angular cuts; to provide a device of this character in which all parts, with the exception of the associated bolts, pins or other fastening means, may be formed by sheet metal stamping operations; and to provide a device of this character capable of mass quantity production with a minimum of production machinery at a minimum of cost and which will be light in weight and small in bulk to facilitate packaging and shipping and avoid heavy shipping charges.

Figure 1:
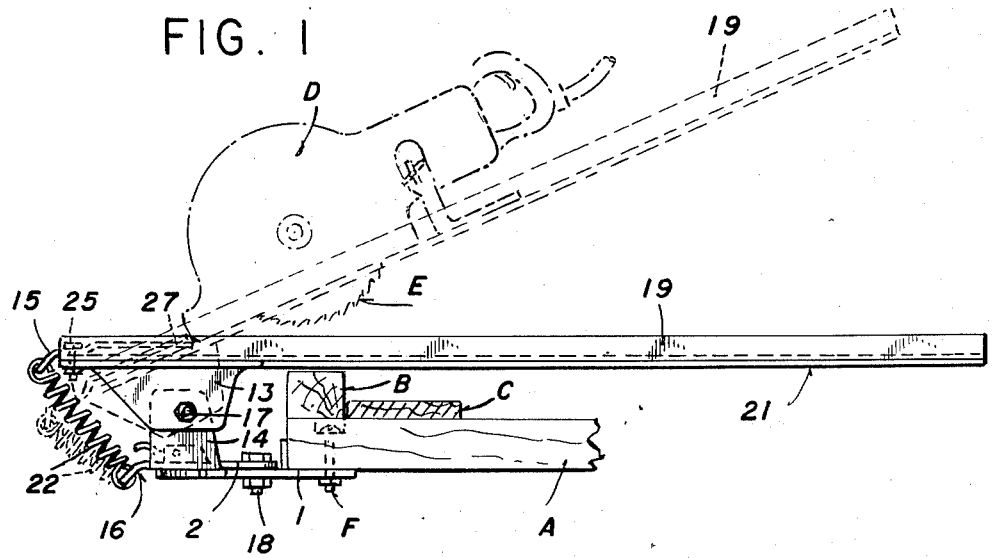
Figure 2:
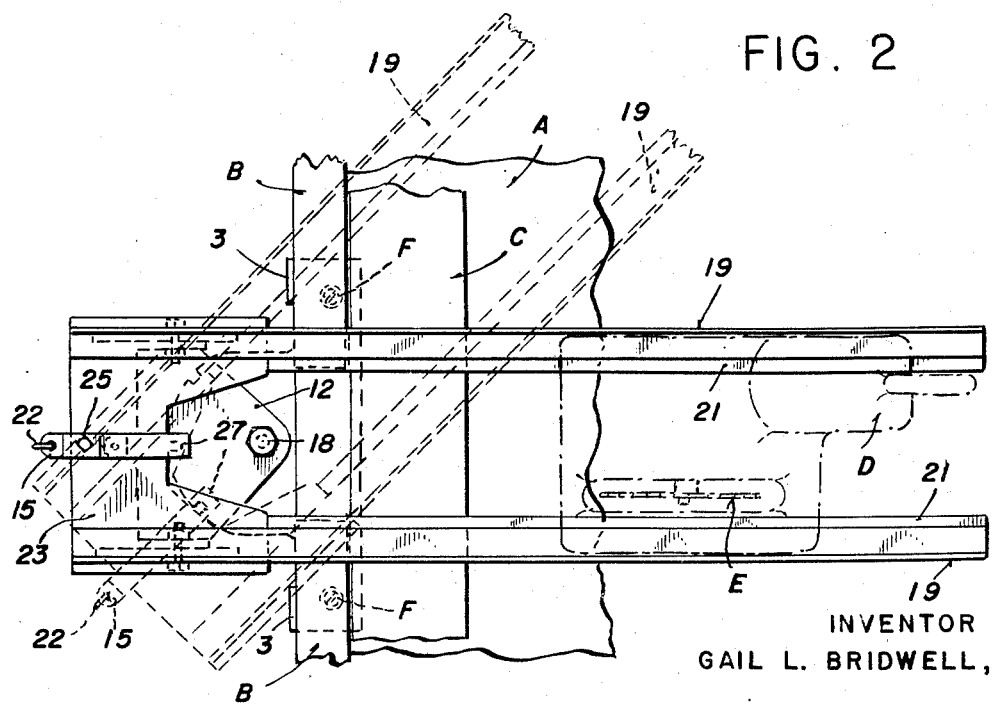
Figure 3:
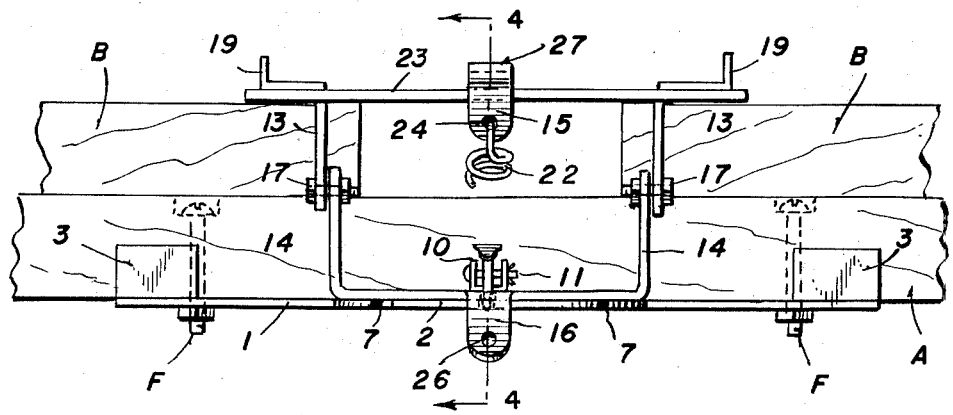
Figure 4:
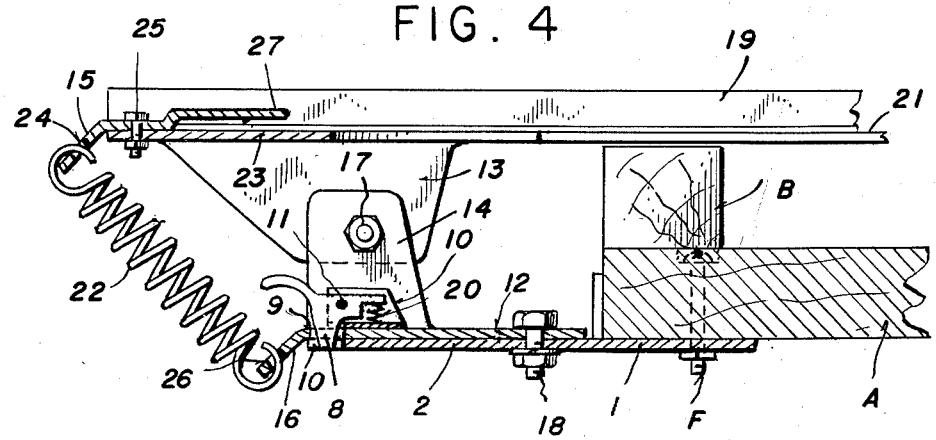
Figure 5:
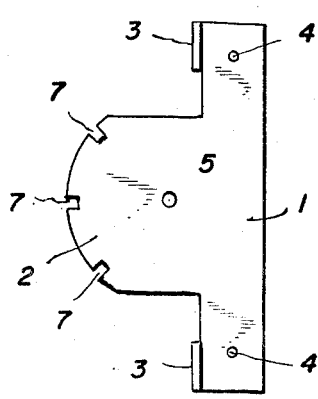

In the accompanying drawings:

Figure 1 represents a side elevation of a portable power saw guide and supporting means embodying the preferred form of my invention, the guide track, with a power saw in place thereon and the tension spring 22 being shown in dotted lines in the raised position of the guide track;

Figure 2, a top plan view thereof, showing the power saw position thereon in dotted lines; the guide track being shown in dotted lines as radially moved in a horizontal plane to make an approximately forty-five degree angular cut;

Figure 3, a rear elevation thereof, the tension spring 22 being broken away;

Figure 4, a sectional view on the line 4—4 of Fig. 3, looking in the direction of the arrows;

Figure 5, a top plan view of the supporting bracket plate; and

Figure 6:
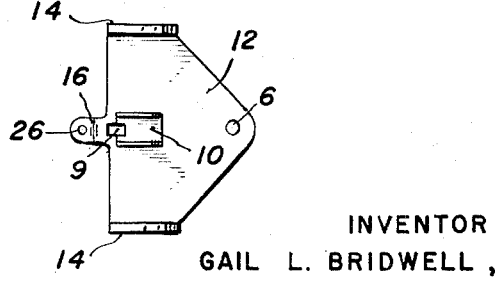

Figure 6, a top plan view of the swivel plate 12.

Referring now in detail to the drawings, I designates a base plate or supporting bracket preferably formed as a metal stamping from heavy sheet metal and having an integrally formed rearwardly extending quadrant or portion 2 formed preferably with an arcuate rear edge portion in which are formed a plurality of locking notches 7 to receive the finger of latch 8 pivotally mounted in the bracket 10 welded or otherwise suitably secured to the swivel plate 12. The tip of the latch 8 is pressed upward by suitable means, such as compression spring 20 confined between the tip of said latch 8 and the upper face of the bottom of said bracket 10 and acted to swing the latch 8 about its pivot pin 11 to hold the finger of the latch 8 in any selected one of the notches 7 to hold the movable parts of the device in any selected angular position about the axis of pivot pin or bolt 18.

The base plate or bracket 1 is formed with suitable provision for mounting it on a suitable support or work bench or table A, such as, for instance, bolt holes 4 to receive bolts F, passing through the table A and plate 1 and receiving suitable nuts on their lower end portions. Preferably, the plate 1 will be formed with a short flange 3 adjacent each end and disposed at right angles to the upper face of plate 1 to contact the adjacent edge face of the table A when said plate 1 is secured by the bolts F to the table A to hold the plate 1 rigidly in place when mounted and resist any tendency to twist or turn or work the bolts F loose.

The base plate or bracket 1 and swivel plate 12 are respectively formed with holes 5 and 6 which register in the assembled relation of said plates to receive the pivot pin or bolt 18, which will preferably receive a suitable lock washer and nut on its lower end portion, as shown, to hold said plates 1 and 12 in assembled relation and permit the swivel plate 12 to swing radially in a horizontal plane about the axis of the pivot means 18 to any selected position of radial adjustment thereabout.

The plate 12 preferably has its side portions bent up at right angles to form upstanding perforated ears 14, of which the axes of the perforations are in substantial transverse registry, said ears 14 respectively lying inside of, closely adjacent to and between corresponding perforated ears 13 vertically depending from and preferably respectively integral with the head plate or block 23. In the assembled relation of the plates 12 and 23 the axes of all of the perforations in the respective ears 13 and 14 will be in substantial transverse registry, and the perforations of each pair of ears 13 and 14 will receive a cooperating bolt and nut 17 to hold them in operative relationship. Of course the particular means, the bolts and nuts 17, for holding said ears in operative relationship is unimportant, it sufficing if there be means provided for holding said parts in such relation that the axes of their perforations are maintained in substantial transverse alignment.

Secured to the upper face of the head plate or block 23 are two right angle, or preferably right angle, angle or track plates 19 disposed parallel to each other and with their vertical flanges forming the outer or distant and guide portions of the tracks or guide. Said track members or angle plates 19 are to be spaced apart just sufficiently to snugly freely slidably receive between their vertical flanges a portable power saw D with its circular saw between, and adjacent to one of, the inner edges of the horizontal flanges of said angle plates or tract members 19.

The angle plates or track members 19 may be secured to the head plate or block 23 in any suitable known conventional means or manner, as by welding, or by rivets or separable fastenings such as nuts and bolts. If separable fastening means are employed one or both of said angle plates or track members 19 may be adjusted in a direction transverse thereof with relation to the other said angle plate or track member 19 to accommodate portable power saws or tools of differing widths.

Preferably the forward end edges of the side portions of the head plate or block 23 will be formed substantially perfectly square or straight both horizontally and vertically and preferably heavy supporting or reinforcing bars 21 will respectively be welded or otherwise suitably secured against the lower surfaces of the respective horizontal flanges of the respective angle plates or track members 19 and have their respective rear end faces formed square and preferably in abutment for substantially their respective full areas with the respective opposing faces of the respective side portions of the said head plate or block 23 to brace the respective angle plates or track members 19 and the track and head plate or block 23 when considered as a unit.

A stop element is secured to the rear edge portion of the head plate or block 23 in any suitable manner, as by a bolt and nut 25 and has a forwardly extending slightly raised forward extending stop to be engaged by the power tool D to prevent the same from sliding rearwardly off of the device when the guide or track is raised, as shown in dotted lines in Figure 1.

Also, preferably integral with the stop element, there is provided a tab or tongue 15 depending downwardly and rearwardly for a short distance from the head plate or block 23 and said tongue or tab 15 is formed with a perforation 24 preferably disposed in line with the longitudinal center of said head plate or block 23.

A similar tongue or tab 16, preferably integral with the swivel plate 12 extends rearwardly and downwardly from the latter and is formed with a perforation 26 preferably in longitudinal alignment with the perforation 24 and the longitudinal central line of said swivel plate 12, and a tension spring, such as the helical spring 22, has its respective ends hooked in the respective perforations 24 and 26 and exerts a pull. During the use of the power tool it will be positioned on the track toward the forward ends of the angle plates 19 and its weight, plus the pressure applied by the operator in moving it lengthwise of the track or angle plates 19 will hold the track down against the top of the work stop B so that as the power saw D is moved rearward the work-piece C will engage the stop B and be held against movement while the saw makes the desired cut therein.

The stop or stops B may be secured in position on the table A in any suitable and conventional manner as by gluing, dowel pins, or otherwise.

When the power saw is moved forward along the track its weight will exert increasing leverage against the pull of spring 22 and will, if moved sufficiently forward, cause the track member or angle irons 19 to swing down, from the raised dotted line position shown in Fig. 1, to rest on the stop or work stop or stops B, as shown in full lines in Figures 1 and 4. When the power tool is moved rearward its leverage will progressively decrease until the pull of the spring 22 can overcome its weight and pull the rear end of the head plate or block 23 down and swing the track to the raised dotted line portion shown in Fig. 1, and this applies in all positions of horizontal angular adjustment.

To adjust the horizontal angular position of the track or angle plates 19 to make cuts of different angles in the work piece C it is simply necessary to raise the rear end of the catch 8 against the opposition of the compression spring 20 until the finger of the catch 8 clears the particular notch 7 and then swing the swivel plate 12 about the pivot pin or bolt 18 to the next desired position of angular adjustment, when the latch or catch 8 is released, permitting its finger to enter the notch 7 corresponding in position to the desired position of angular adjustment, thus locking the plate 12 to the plate 1 and preventing relative movement between the two.

The central forward side or end portion of the head plate or block 23 will preferably be cut away to permit the portable power saw unit D to be moved close to the rear end of the track without its saw E hitting any metal part and to this same end the forward end of stop 27 will be so located as to stop the rearward movement of the power saw D before its saw E comes in contact with any metal part.

Preferably the plates 1, 12, 23 and 21 will be formed by suitable cutting and sheet metal stamping, punching and forming operations from very heavy steel sheets or light steel plates and the angle plates 19 may be similarly formed from relatively light steel sheets, also the bracket 10. The catch or latch 8 may be either a stamping from heavy sheet metal, or a casting.

I claim:

1. A portable power saw guide and support comprising a base plate to be secured to a work table, a head plate formed with vertically depending integral perforated ears, and a pair of guiding and supporting track members rigidly mounted on said head plate and disposed parallel to each other and each having a horizontal supporting flange and a vertical guiding flange, said respective guiding flanges being disposed at the outer portions of said respective supporting flanges and spaced from each other such distance as to snugly slidably receive between them the body of a portable power saw, in combination with a swivel plate formed with vertically upwardly extending integral perforated ears fitting between the ears of said head plate, the perforations of all of said ears being in transverse alignment, means pivotally connecting the respective ears of said swivel plate with the respective ears of said head plate, a bolt and nut securing said swivel plate to said base plate for pivotal movement about said bolt in a horizontal plane, the rear edge portion of said base plate being formed with a plurality of notches, a pivotally mounted spring pressed catch mounted in fixed position on said swivel plate and extending through the same and normally engaging in a selected one of said notches to lock said head plate, track members and swivel plate in any selected position of angular adjustment, and tension spring means connecting the rear portion of said head plate and said swivel plate and tending to pull the rear portion of said head plate down and to swing the track members up.

2. A portable power saw guide and support comprising a base plate to be secured to a work table, a head plate formed with vertically depending rigid perforated ears, a pair of guiding and supporting track members rigidly mounted on said head plate and disposed parallel to each other and having each a horizontal supporting flange and a vertical guiding flange, said respective guiding flanges being disposed at the outer portions of said respective supporting flanges and spaced from each other such distance as to snugly slidably receive between them the body of a portable power saw, in combination with a swivel plate formed with vertically upwardly extending perforated rigid ears fitting between the ears of said head plate, the perforations of all of said ears being in transverse alignment, means pivotally connecting the respective ears of said swivel plate with the respective ears of said head plate, a pivot pin securing said swivel plate to said base plate for pivotal movement about said pin in a horizontal plane, said base plate being formed with a plurality of sockets, a pivotally mounted spring pressed catch mounted in fixed position on said swivel plate and extending through the same and normally engaging in a selected one of said sockets to lock said head plate, track members and swivel plate in any selected position of angular adjustment, and spring means connecting said head plate and said swivel plate and tending to swing said head plate about its pivotal mounting to swing the rear portion of said head plate down and raise said track members.

3. A portable power saw guide and support comprising a base plate to be secured to a work table, and a guiding and supporting track unit, in combination with a swivel plate, track pivot means for pivotally connecting the track unit to the swivel plate to swing in a vertical plane about the axis of said track pivot means, pivotal means for securing said swivel plate to said base plate for pivotal movement in a horizontal plane, said base plate being formed with a plurality of sockets, a pivotally mounted spring pressed catch mounted in fixed position on said swivel plate and extending through the same and normally engaging in a selected one of said sockets to lock said track unit and said swivel plate in any selected position of angular adjustment, and tension spring means connecting said track unit at a point to the rear of said track pivot means to said swivel plate and tending to pull the rear portion of said track unit down and elevate the forward portion thereof.

4. A portable power tool guide and support comprising a base plate to be secured to a work table, and a guiding and supporting track unit, in combination with a swivel plate, track pivot means for pivotally connecting said track unit to the swivel plate to swing in a vertical plane about the axis of said track pivot means, pivotal means for securing said swivel plate to said base plate for pivotal movement in a horizontal plane, said base plate being formed with a plurality of sockets, a catch mounted on said swivel plate and extending through the same and normally engaging in a selected one of said sockets to lock said track unit and swivel plate in any selected position of angular adjustment, and spring means interposed between said track unit and swivel plate and tending to swing the track unit about said track pivot means to depress the rear portion and raise the forward portion of said track unit.

5. A portable power tool guide and support comprising a base plate to be secured to a work table, and a guiding and supporting track unit, in combination with a swivel plate, track pivot means for pivotally connecting said track unit to the swivel plate to swing in a vertical plane about the axis of said track pivot means, pivotal means for securing said swivel plate to said base plate for pivotal movement in a horizontal plane, a catch mounted on said swivel plate and normally engaging in said base plate to lock said track unit and swivel plate in a selected position of angular adjustment, and spring means interposed between said track unit and swivel plate and tending to swing the track unit about said track pivot means to depress the rear portion and raise the forward portion of said track unit.

GAIL L. BRIDWELL.

No references cited.